G. B. PHILLIPS.
RIVET.
APPLICATION FILED APR. 22, 1916.
1,228,239.
Patented May 29, 1917.
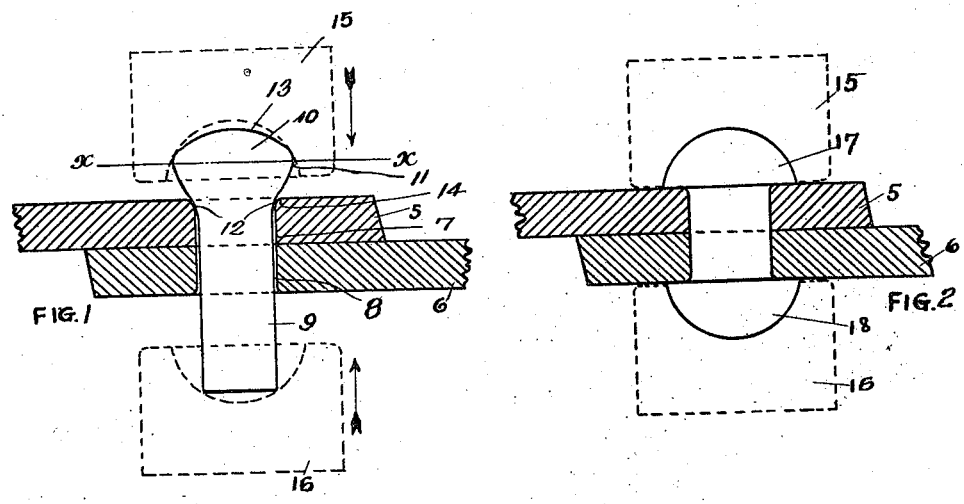
INVENTOR.
George B Phillips
By Charles J. Schmidt
attorney

UNITED STATES PATENT OFFICE.

GEORGE B. PHILLIPS, OF LIMA, OHIO, ASSIGNOR OF ONE-THIRD TO SHERMAN S. LAWSON AND ONE-THIRD TO WATSON M. MYERS, BOTH OF LIMA, OHIO.

RIVET.

1,228,239.  Specification of Letters Patent.  Patented May 29, 1917.

Application filed April 22, 1916. Serial No. 92,825.

*To all whom it may concern:*

Be it known that I, GEORGE B. PHILLIPS, a citizen of the United States, and a resident of Lima, in the county of Allen and State of Ohio, have invented certain new and useful Improvements in Rivets, of which the following is a specification.

This invention relates to rivets, particularly to rivets to be used in seams where it is necessary to make the joint tight against the leakage of any element such as gas, steam, or water.

In riveting plates or other parts together, it is well known that the rivet holes are usually made a trifle larger than the diameter of the rivets to be used in order that the heated rivets can be readily inserted, and that it is desirable and necessary to fill the rivet holes during riveting if good results are to be accomplished. For example, in riveting together plates for boilers, tanks, or the like, the rivet holes should be filled in order to prevent leakage of the boiler or tank contents, and to prevent displacement of the plates. Compression and displacement of the metal of the rivets must be accomplished while the metal is highly heated. When a hot rivet is inserted into a rivet hole through cold plates cooling quickly takes place, and where the rivet head has heat radiating corners or projections cooling will be hastened. The riveting dies engaging with these corners or projections will also quickly draw heat from the head. Rivets as ordinarily used at the present day have such heat radiating corners or projections and the rivets usually cools sufficiently to resist sufficient compression and displacement to fill the rivet hole during the riveting operation and the rivet body will merely bend and distort without filling the hole.

I have found that a rivet whose head is of compact form devoid of heat radiating corners or projections will retain its heat much longer and will much more readily fill the rivet hole. I have also found that the flow of metal under riveting blows or pressure will tend to follow the surface line of the rivet below its plane of maximum width, and that if below such plane the rivet head is convex, and at its lower end is concave to gradually come to the same diameter as the cylindrical body, the metal will shift readily from the head into the rivet hole without interference by the rivet hole edge, and that owing to such shifting of the metal from the head into the rivet hole, and the compression of the rivet body, a rivet hole of great length can be completely and snugly filled. This is of particular importance where a number of overlapping plates to a large aggregate depth are to be riveted together, to insure the complete filling of the rivet hole and prevent leakage from one seam to another by way of the rivet hole, and to securely bind the plates together against lateral displacement or movement. With the forms of rivet heretofore devised the metal, if it flows at all, will fill in only a short distance at the ends of the rivet hole, leaving an intermediate space between the rivet and plates through which leakage could take place from seam to seam.

On the accompanying drawing I show a form of rivet which embodies the features of my invention. On the drawing—

Figure 1 is a side elevational view of a rivet inserted in a rivet hole through two plates which are in section, and Fig. 2 shows the rivet after the riveting operation.

5 and 6 represent the two overlapping plates having the holes 7 and 8 which register to form a continuous rivet hole. The rivet shown has the cylindrical body 9 and the head 10, this head below its plane $x$—$x$ of maximum width being convex as shown at 11, and the lower part of the head being concave as indicated at 12 to gradually come to the same diameter as the cylindrical body 9. The top of the rivet 13 above the plane $x$—$x$ may be convex as shown, or may be of different shape the entire head being knob-shaped and compact and devoid of heat radiating corners or projections. The body 9 of the rivet is of slightly smaller diameter than the rivet hole in order that when the rivet is heated it may be readily and quickly inserted in the hole, and when inserted the concave section 12 will rest against the edge 14 of the rivet hole and the rivet will be held with the greater part of its head above the hole and only the lower end of the concave section therein. Now, when the dies 15 and 16 are brought against the head and the projecting lower end of the rivet, the metal of the head will tend to follow the direction of the surface below the plane $x$—$x$, that is, the metal at the lower part of the head will follow the direction of the concave surface lines at section 12 and the metal above this section will follow, and this forced in metal, together with the metal shifted or upset radially when the rivet body is compressed, will completely fill the rivet hole, and at the end of the riveting operation the finished riveting heads 17 and 18 will have been formed as indicated in Fig. 2. With my improved rivet I have been able to completely fill rivet holes whose lengths are many times the length of the diameter of the rivet body. The rivet can be manufactured as readily and as cheaply as any of the ordinary rivets now on the market.

I do not desire to be limited to the exact shape of rivet shown as other shapes are possible which would still come within the scope of the appended claim.

I claim as follows:

A rivet consisting of a cylindrical body and a knob-shaped head of compact form devoid of heat radiating corners or projections, the head below its plane of maximum width being convex and its lower part being concave to gradually come to the same diameter as the cylindrical body whereby when riveting pressure is applied metal will shift readily from the head into the rivet hole without interference by the rivet hole edge.

In witness whereof I hereunto subscribe my name this 17 day of April, A. D., 1916.

GEORGE B. PHILLIPS.